Oct. 26, 1971　　　　　　　D. H. PRYOR　　　　　3,615,154
GRIPPER

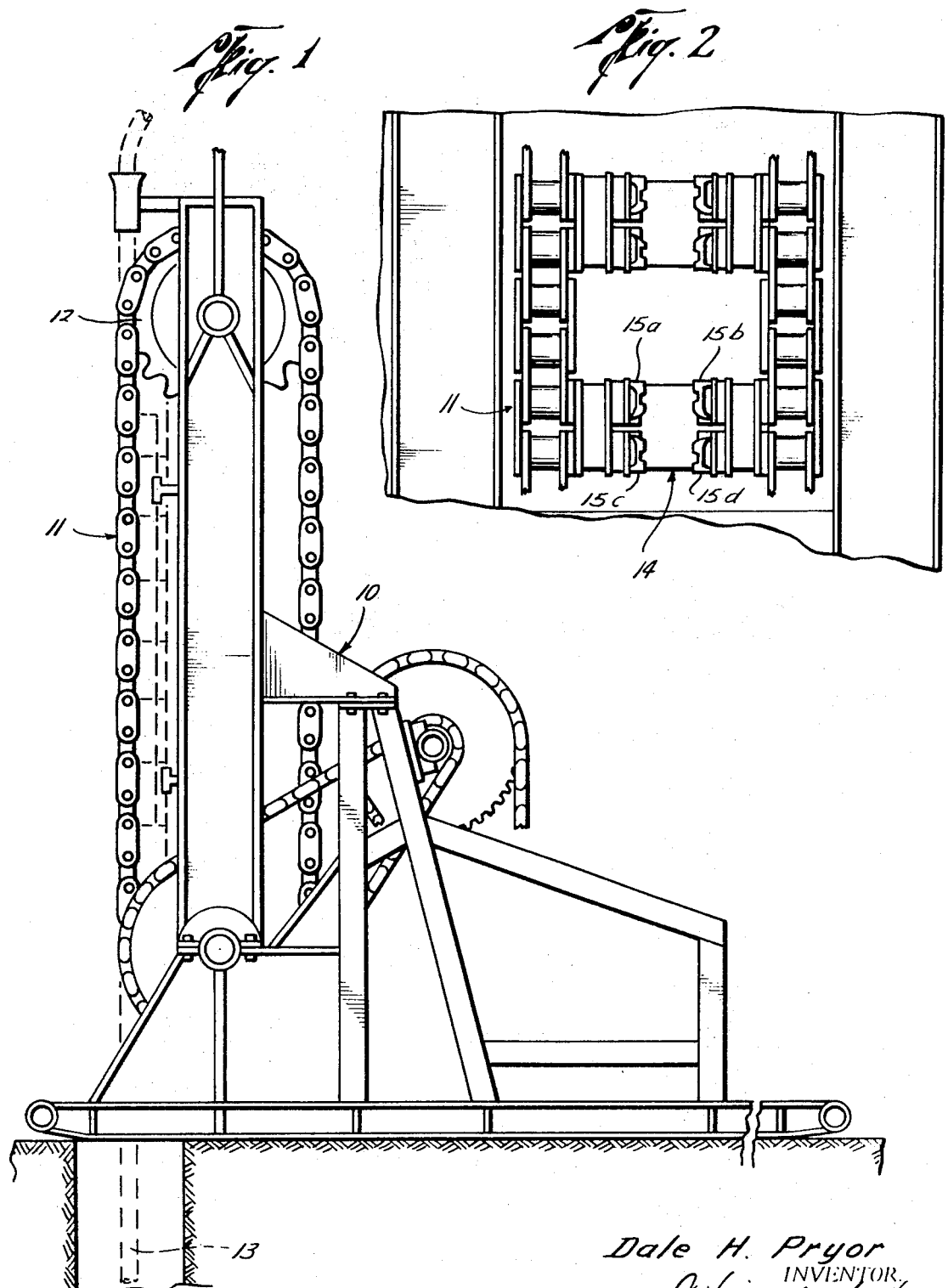

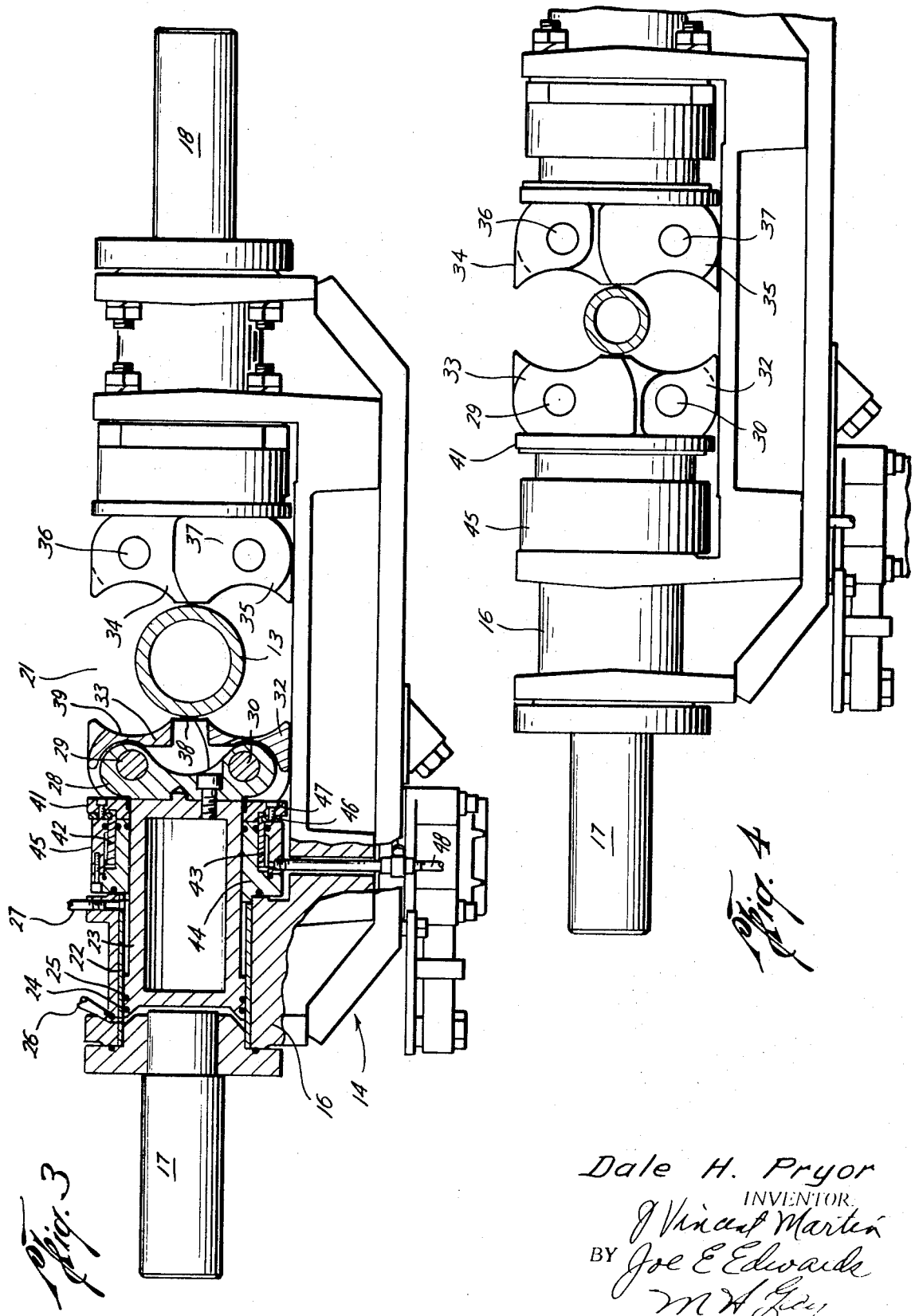

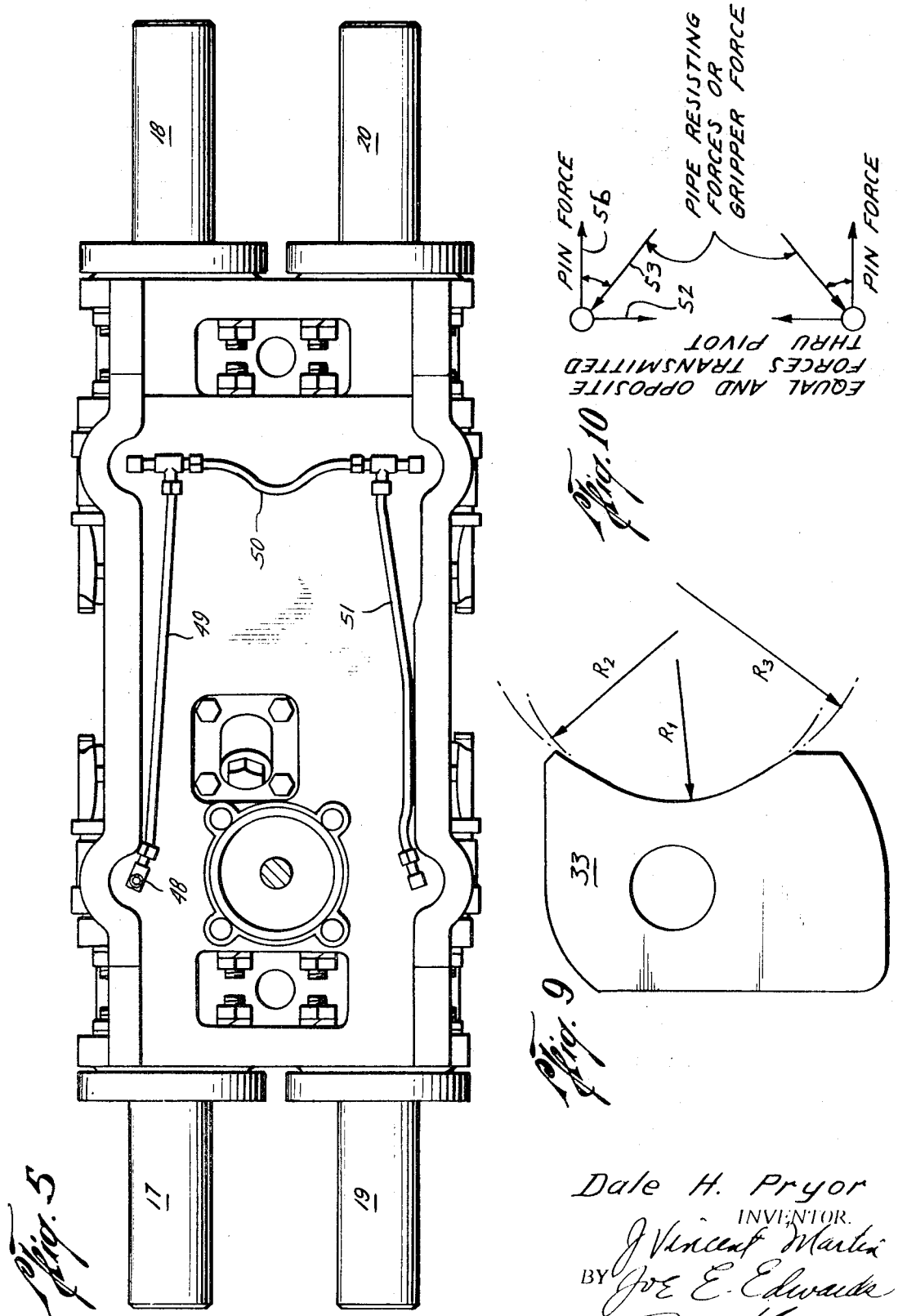

Filed Sept. 19, 1969　　　　　　　　　　　　　4 Sheets-Sheet 4

Dale H. Pryor
INVENTOR.

BY J. Vincent Martin
Joe E. Edwards
M. H. Gay
ATTORNEYS

United States Patent Office 3,615,154
Patented Oct. 26, 1971

3,615,154
GRIPPER
Dale H. Pryor, Houston, Tex., assignor to Youngstown
Sheet and Tube Company, Youngstown, Ohio
Filed Sept. 19, 1969, Ser. No. 859,489
Int. Cl. B65h 17/34
U.S. Cl. 226—173                                5 Claims

ABSTRACT OF THE DISCLOSURE

A retractor having an endless train made up of a plurality of grippers. The grippers have contoured gripping faces which are contoured to grip pipe of different sizes and the degree of movement of the grippers toward and away from pipe engaging positions is selectively controlled relatively to the size of pipe being gripped. The grippers are mounted on pivot pins at positions to either side of the center line of the piston supplying the gripping force to increase the resultant gripping force exerted by the grippers.

---

This invention relates to apparatus for gripping a cylindrical surface such as a pipe. In one form the invention relates to a retractor having gripping assemblies for handling pipe.

Cullen Pat. No. 2,892,535 issued June 30, 1959, illustrates a retractor using hydraulically operated grippers to handle pipe. This invention is an improvement on the type of retractor and grippers shown in the Cullen patent, in that the gripping force is increased without increasing the applied force, in that a single set of grippers can be used for pipe of different sizes, and in that the volume of hydraulic fluid for operating the grippers is held to a minimum with multiple size pipe.

Accordingly, it is an object of this invention to provide a machine having reciprocally operated grippers for gripping a cylindrical object which grip with greater holding force than the conventional grippers such as shown in the Cullen patent.

Another object is to provide a machine having grippers which will operate on several different sizes of pipe or other objects.

Another object is to provide a machine having grippers which operate on objects of different size and wherein the amount of hydraulic fluid is held to a minimum.

Another object is to provide a machine with grippers for gripping different size objects in which the operating members for the grippers are prevented from fully retracting when handling small size members to conserve the volume of fluid necessary for operating a gripper.

Another object is to reduce the stroke required for a gripping apparatus by simultaneously moving the gripper jaws away from the object to be gripped while rotating the jaws to fully open position.

Other objects, features, and advantages of the invention will be apparent from the drawings, the specification, and the claims.

In the drawings wherein like numerals indicate like parts, and wherein an illustrative embodiment of this invention is shown:

FIG. 1 is a diagrammatic view in side elevation of a retractor constructed in accordance with this invention;

FIG. 2 is a fragmentary front view of the retractor showing a portion of the endless chain of grippers;

FIG. 3 is a top plan view partly in elevation and partly in cross section illustrating one of the grippers;

FIG. 4 is a view similar to FIG. 3 in elevation illustrating the gripper stop in extended position while running small size pipe.

FIG. 5 is a view in elevation of the rear of one of the grippers;

FIG. 9 is a diagrammatic view illustrating the different curvature of the gripping face of the grippers for handling different size pipe;

FIG. 10 is a force diagram illustrating the manner in which the gripping force is increased over that obtained by the structure shown in Cullen Pat. 2,892,535.

FIGS. 1 and 2 show the retractor indicated generally at 10 to include an endless chain of grippers indicated generally at 11 trained over sprockets, one of which is shown at 12. The grippers are hydraulically controlled to raise or lower the drill pipe 13, all in the manner more fully explained in the Cullen Pat. 2,892,535.

Figure 6:
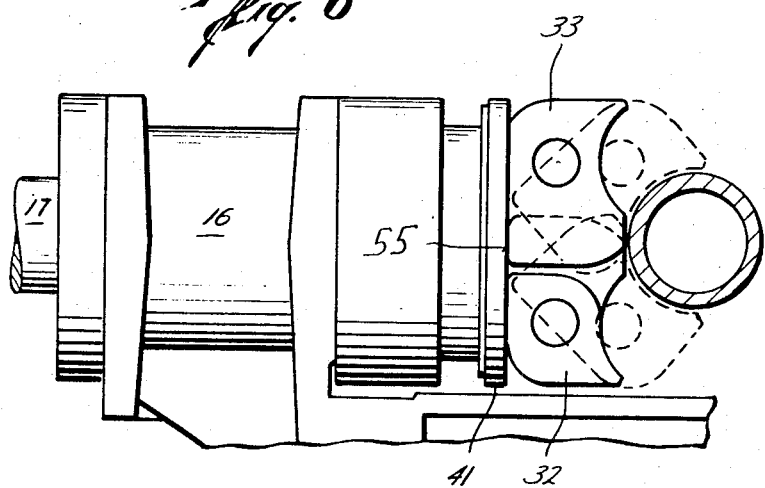
FIGS. 6 and 7 are plan views in elevation of fragments of the grippers comparing the action of the gripper when running different size pipe.

As shown in FIG. 2, each of the grippers indicated generally at 14, includes a double bank of gripper shoes 15a, b, c, and d. The upper gripper shoes and lower gripper shoes 15a, 15, 15b and 15d operate as a unit.

Referring now particularly to FIG. 3, the gripper includes a housing 16 which carries trunnions 17, 18, 19, and 20 (FIG. 5). These trunnions form a part of the endless chain 11.

The housing 16 has an opening 21 in its front side for receiving the pipe 13 to be moved up or down by the retractor.

Opposed members for supporting gripper shoes are reciprocally mounted in a housing. Preferably, opposed cylinders are provided in said housing on opposite sides of the opening 21. Only one of these cylinders and its associated pistons and other apparatus is shown in FIG. 3, as the gripper shoe on the other side is manipulated by an identical structure. The cylinder is provided by housing 44 and a liner 22 in housing 16. A piston 23 reciprocates in the cylinder and controls the gripping or releasing of the pipe 13. The cylinder is provided with a pair of seals 24 and 25, which may be V type packing facing in opposite directions. The piston is reciprocated by flow of fluid to and from the cylinder through the conduits 26 and 27 in the conventional manner.

A yoke 28 is carried by each piston and is reciprocal in the opening 21.

A pair of pivot pins 29 and 30 are carried by the yoke with their rotational axes in a plane normal to the axis of the associated piston. The pivots are on opposite sides of such axis as shown in FIG. 3. By thus positioning the pivot pins no side loading is imposed upon the piston 23 due to gripping of a pipe and this arrangement of pivot pins is preferred. It will be apparent that they could be positioned other than in such a plane but this would result in undesirable side loading being imposed on piston 23.

A gripper shoe is provided on each pivot pin for engaging the pipe 31 in the opening. These shoes are shown at 32 and 33 associated with the pins 29 and 30. Like shoes are provided on the other side of the pipe at 34 and 35, carried on pivot pins 36 and 37, respectively. Preferably, each gripper shoe has a surface 38 which initially engages the pipe as the gripper shoes are urged towards the pipe to rotate them about their associated pivots and brings the gripping face 39 of each shoe into contact with the pipe in opening 21.

The gripper shoes are contoured, as will be explained more fully hereinafter, for engaging different size pipe. As the shoes will thus be in different positions in the opening 21 when they engage different size pipe, the gripper is preferably provided with means to limit the stroke with small size pipe to reduce the volume of fluid necessary to reciprocate the piston.

The gripper is preferably provided with a stop to selectively limit retraction of the yoke 28 when the retractor is used to handle small diameter pipe. For example, in FIG. 4, the stop 41 is extended to a position in which it limits retraction of the yoke 28, and thus reduces the amount of fluid necessary to operate the gripper. The stop 41 may be extended and held in position in any desired mechanical or fluid manner. Preferably, fluid is employed, as a fluid control stop will permit simultaneous extension or retraction of the stop on a large number of grippers substantially instantaneously.

The stop 41 is extended by an annular piston 42 in the annular groove 43 provided by the housing 44 and its associated sleeve 45. At the outer end of the piston 42 a split ring 46 fits in a groove in the piston 42 and the stop 41 is secured to the split ring 46 by suitable studs 47.

Fluid from a source not shown is introduced into or vented from the cylinder 43 through line 48. It will be noted from FIG. 5 that the fluid from line 48 passes through conduits 49, 50, and 51 to each of the four stop control cylinders for each gripper shoe to thus simultaneously pressurize or permit the exhaustion of pressure from each of these cylinders. Thus, when it is desired to extend the stops 41 to handle small diameter pipe, the line 48 is pressurized to extend the stops. When it is desired to handle large diameter pipe, the line 48 is vented and the pressure fluid acting to retract the main piston 23 will retract the stop to the position shown in the FIG. 3. Thus, the stop 41 may be reciprocated between FIG. 3 and FIG. 4 positions to handle different size pipe.

Figure 7:
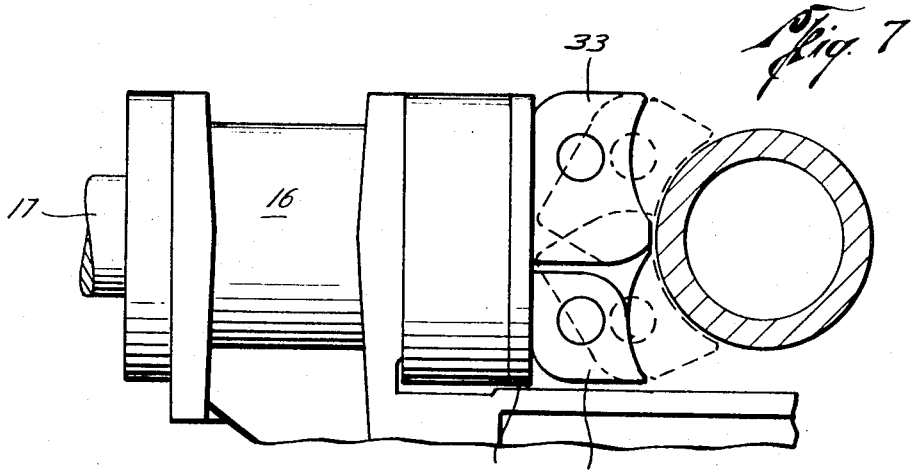

The relationship of the stop and grippers is further illustrated in FIGS. 6 and 7 and shows the stop extended in FIG. 6 and retracted in FIG. 7. The figures also illustrate along with FIG. 8 the relationship of the gripping shoes to the large and small diameter pipe.

The gripper shoes each has a surface 55 on their back side which is spaced from the pivot and engages the stop on retraction of the shoes. This engagement occurs after a short movement of the shoes and forces the shoes to rotate to full open position simultaneously with retraction of the shoes to open position.

The forces effective to grip the pipe are illustrated in FIG. 10. The piston force resolves itself into a force acting in the direction of the piston, as illustrated by line 56, and forces tending to spread the pivots apart as illustrated by reaction force line 52. The resultant force 53 is pipe resisting force or the force applied by the grippers to the pipe. This force is greater than a comparable force which would result from the application of the same piston force to the grippers shown in Cullen Pat. 2,892,535.

Figure 8:
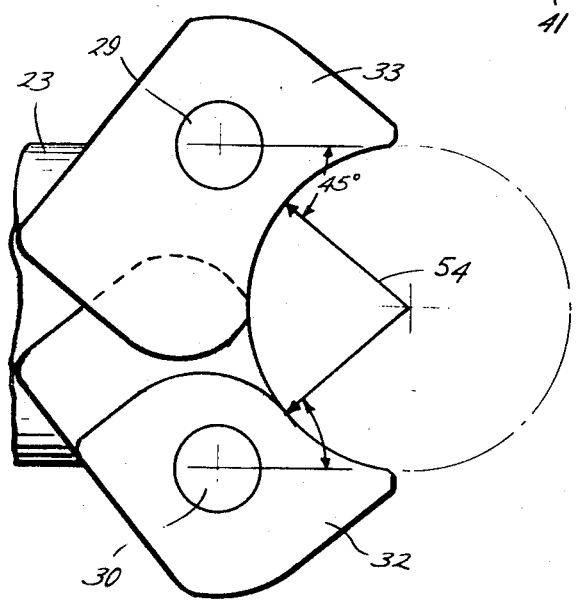
FIG. 8 is a diagrammatic view illustrating the angular relationship of the gripper shoes with a pipe.

As the pivot pins on one yoke are moved toward or away from each other, it will be appreciated that the resultant force 53 will change. Preferably, the angle between the pin force, as represented by line 56, and the resultant, as represented by line 53, is approximately 45°. With this relationship the gripping surfaces of each gripper shoe can engage a maximum area of pipe to minimize any tendency to crush the pipe. Thus, as illustrated in FIG. 8, if a gripper shoe be utilized which has a single radius, it would preferably be formed at approximately a 45° angle with the direction of movement of the pivot. Also, it will be noted that the line 54 extends approximately through the center of or bisects the gripping face of the gripper shoe. This will provide for the application of equal forces throughout substantially the entire gripping face of the gripper shoe. It will be appreciated that the pins might be moved to a position at which the relationship is other than shown in FIG. 8.

Given below is mathematical proof of the increase in pipe holding force between grippers constructed in accordance with this invention and grippers of the type shown in Cullen Pat. 2,892,535.

PIVOTED DOUBLE SHOE

GIVEN:
F=Piston force applied to yoke
F/2=Piston force applied to pivot pin
R=Force each gripper shoe applied to the pipe
P=Reaction force carried through pivot pin
$\theta$=Angular relationship between piston force and force applied to the pipe FIND: The total holding force of the gripper shoes (Z)
SOLUTION:

(1) $$R = \frac{F}{2 \cos \theta}$$

(2) $$Z = f[4R]$$

Where $f$=coefficient of friction and constant 4 is the number of shoes.

$$Z = 4f \left[ \frac{F}{2 \cos \theta} \right] = \frac{2fF}{\cos \theta}$$

Example

GIVEN:
Piston dia.=6 in.
Rod dia.=5.5 in.
Hydraulic pressure=2000 p.s.i.
Back pressure=200 p.s.i.
Angle $\theta$ for 5½ in. pipe=41°
Coefficient of friction ($f$)=.19

FIND: Holding force (Z)
SOLUTION:

$$\text{Piston force (F)} = \frac{\pi}{4}(6)^2(2000) - \frac{\pi}{4}(6^2 - 5.5^2)(200)$$

$$= 56,500 - 903 = 55,597 \text{ lbs.}$$

$$\cos \theta = .755$$

$$Z = \frac{2(.19)(55597)}{.755} = 27,980 \text{ lbs.}$$

SINGLE NON-PIVOTED SHOE

F=Piston force
Z=Holding force
Z=2fF
where $f$=coefficient of friction, constant 2=No. of shoes.

Example

GIVEN:
Same data as previous example
FIND: holding force (Z)
SOLUTION:
F=55,597 lbs. (see previous example)
Z=2 (.19) (55,597)=21,100 lbs.

By reference to FIGS. 6 and 7 it will be noted that a line extending between the centers of the pipe and the pivot varies from 45° relative to the direction of movement of the pivot. In FIG. 6 this angle will be approximately 49°, as the pipe being engaged is smaller. In FIG. 7, where a larger pipe is engaged, the angle will be approximately 41°. Thus, where different size pipe are engaged by a common gripper, the design is preferably such that in each case the gripping angle is as close to 45° as possible. However, the relationships illustrated in FIGS. 6 and 7 demonstrate that this angle is not critical, and it is only preferred that the angle approximate 45° to permit the use of as large gripping faces as possible to reduce the tendency to deform or crush the pipe while still obtaining the advantage of an increased gripper force due to the employment of a pair of grippers spaced to either side of the central axis of the piston.

Reference is now made to FIG. 9 wherein the manner in which the gripper shoe 33 has its gripping face contoured to fit different size pipe is illustrated. In the running of flexible pipe with the retractor, there will be one or two relatively close sizes of drill pipe. In a shallow well, only a single size of drill pipe will be utilized, but in a deep well two sizes of drill pipe may be utilized. In either case, a relatively larger size drill collar and drilling motor will be carried on the lower end of the drill pipe. It is desirable that the grippers be able to accommodate at least two and preferably three different sizes of pipe. For this purpose, the center section of the gripping face of the grippers is contoured on the radius $R_1$, as shown in FIG. 9. This radius would provide for gripping the smaller size pipe. The radius $R_2$ would provide for gripping the slightly larger size pipe. As the pipe to be utilized as drill pipe is flexible to a certain extent, the contour of the gripper face represented by the lines $R_1$ and $R_2$ will be in engagement with the flexible pipe, as the difference in the curvature of $R_1$ and $R_2$ is very slight and the flexible pipe will accommodate itself to this difference. The radius $R_3$ is the radius of the much larger motor housing and drill collars. These are usually non-flexible surfaces, but as they are run on the lower end of the string, relatively little gripping force is needed and they can be supported by engagement with the surfaces represented by $R_3$ on the gripping face.

From the above it will be seen that all of the objects of this invention have been obtained. The gripping force on a pipe to be handled by a retractor has been increased by applying force at an angle instead of direct. While the reciprocal member supporting the gripper shoes may be reciprocated mechanically or by fluid, the fluid system is presently preferred. A fluid saving system has been provided when utilizing pipe of different sizes which by positioning a stop reduces the volume of fluid which must be circulated. By a comparison of the Cullen patent and this disclosure it will be seen that the piston stroke to open the jaws is reduced due to the stop 41 engaging the gripping jaws and rotating them about their pivots as they are retracted. This opens the jaws with a minimum piston stroke. Also the system is provided with grippers which are capable of handling a plurality of different sizes of pipe, thus permitting a single retractor to run drill pipe of different size as well as drill motor and the collars which will normally be of substantially larger size than the drill pipe.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A retractor comprising an endless chain, a plurality of grippers on said chain for gripping a pipe, each gripper comprising:
    a housing having trunnions on opposite ends thereof forming a part of the endless chain,
    an opening in one side of the housing for receiving a pipe to be moved by the retractor,
    opposed reciprocating members mounted in said housing on opposite sides of said opening,
    means for reciprocating said members,
    a yoke carried by each member and reciprocal in said opening,
    a pair of pivot pins carried by each yoke with their rotational axes in a plane normal to the axis of the associated reciprocating member and on opposite sides of the central axis thereof,
    and a gripper shoe on each pivot pin for engaging a pipe in the opening.

2. The retractor of claim 1 wherein a line between the rotational axis of a pivot pin and the central axis of a pipe being gripped approximately bisects the gripping face of a shoe and extends at approximately a 45° angle relative to the axis of the associated reciprocating member.

3. The retractor of claim 1 wherein the gripping face of each shoe is contoured on at least two radii with the shorter radius at the center of the shoe to provide for gripping of pipe of different sizes by the same shoes.

4. The retractor of claim 3 wherein an adjustable stop is provided selectively limiting retraction of the yoke when the retractor is used to handle the smaller diameter pipe and rotate the gripper shoes to full open position during retraction of the pistons.

5. The retractor of claim 1 wherein a stop is carried by the housing and engages the gripper shoes during the retracting stroke of the reciprocating member to rotate the gripper shoes to full open position.

References Cited

UNITED STATES PATENTS

| | | | |
|---|---|---|---|
| 2,892,535 | 6/1959 | Cullen et al. | 226—173 |
| 3,197,835 | 8/1965 | Brown | 24—263.5 |

RICHARD A. SCHACHER, Primary Examiner

G. A. CHURCH, Assistant Examiner

U.S. Cl. X.R.

269—217; 24—263